(12) United States Patent
Watson et al.

(10) Patent No.: US 8,591,298 B1
(45) Date of Patent: Nov. 26, 2013

(54) POULTRY WING DEBONING APPARATUS AND METHOD

(71) Applicants: George Richard Watson, Fort Smith, AR (US); James Richard Stockland, Fayetteville, AR (US); Richard Allen Stockland, Springdale, AR (US)

(72) Inventors: George Richard Watson, Fort Smith, AR (US); James Richard Stockland, Fayetteville, AR (US); Richard Allen Stockland, Springdale, AR (US)

(73) Assignee: Three Dick Farms, Inc., Fayetteville, AR (US)

( * ) Notice: Subject to any disclaimer, the term of this patent is extended or adjusted under 35 U.S.C. 154(b) by 0 days.

(21) Appl. No.: 13/678,788

(22) Filed: Nov. 16, 2012

Related U.S. Application Data

(63) Continuation-in-part of application No. 12/378,816, filed on Feb. 19, 2006, now abandoned.

(60) Provisional application No. 61/066,568, filed on Feb. 21, 2008.

(51) Int. Cl.
*A22C 17/00* (2006.01)

(52) U.S. Cl.
USPC .......................................................... 452/135

(58) Field of Classification Search
USPC ......... 452/135, 149, 150, 153, 156, 157, 177, 452/180
See application file for complete search history.

(56) References Cited

U.S. PATENT DOCUMENTS

| | | | | |
|---|---|---|---|---|
| 4,385,419 A * | 5/1983 | Cantrell | ........................ | 452/135 |
| 4,593,432 A * | 6/1986 | Hazenbroek | ................... | 452/136 |
| 4,811,457 A * | 3/1989 | Lindert | ......................... | 452/136 |
| 5,071,388 A * | 12/1991 | Lindert et al. | ................ | 452/166 |
| 5,197,917 A * | 3/1993 | Verbakel et al. | ............... | 452/131 |
| 5,232,397 A | 8/1993 | Gagliardi, Jr. | ................ | 452/169 |
| 5,267,891 A | 12/1993 | Cresson et al. | ............... | 452/136 |
| 5,286,229 A | 2/1994 | Gagliardi, Jr. | ................ | 452/169 |
| 5,368,519 A | 11/1994 | Curtis et al. | ................... | 452/135 |
| 5,494,479 A * | 2/1996 | Lindert et al. | ................ | 452/135 |
| 5,588,906 A * | 12/1996 | Davis | ............................ | 452/179 |
| 5,746,649 A * | 5/1998 | Skaar et al. | .................... | 452/172 |
| 5,782,685 A * | 7/1998 | Hazenbroek et al. | ......... | 452/138 |
| 5,810,653 A * | 9/1998 | Van Craaikamp et al. | ... | 452/136 |
| 5,813,908 A * | 9/1998 | Craaikamp | ................... | 452/136 |
| 5,976,004 A * | 11/1999 | Hazenbroek | ................... | 452/136 |
| 6,007,417 A * | 12/1999 | Jones et al. | .................... | 452/138 |
| 6,024,636 A * | 2/2000 | Hazenbroek et al. | ......... | 452/138 |
| 6,027,404 A * | 2/2000 | Wols | ............................. | 452/138 |
| 6,383,067 B1 * | 5/2002 | Kessel | .......................... | 452/138 |
| 6,688,461 B1 * | 2/2004 | Frazier et al. | ............. | 198/867.09 |
| 7,198,564 B2 * | 4/2007 | Hino et al. | .................... | 452/135 |
| 7,530,888 B2 * | 5/2009 | Annema et al. | ................ | 452/167 |
| 8,157,625 B2 * | 4/2012 | Hazenbroek et al. | ......... | 452/136 |

* cited by examiner

*Primary Examiner* — Richard Price, Jr.
(74) *Attorney, Agent, or Firm* — Keisling & Pieper PLC; Trent C. Keisling

(57) ABSTRACT

An apparatus and method for deboning a poultry wing including multiple stations. The poultry wing is cut and then placed with bones extending through a plate for engagement by a subsequent rotary disboner. The mechanism includes a convey or with the plates secured thereto and motor and controls for moving the conveyor and plates and rotary deboner.

20 Claims, 3 Drawing Sheets

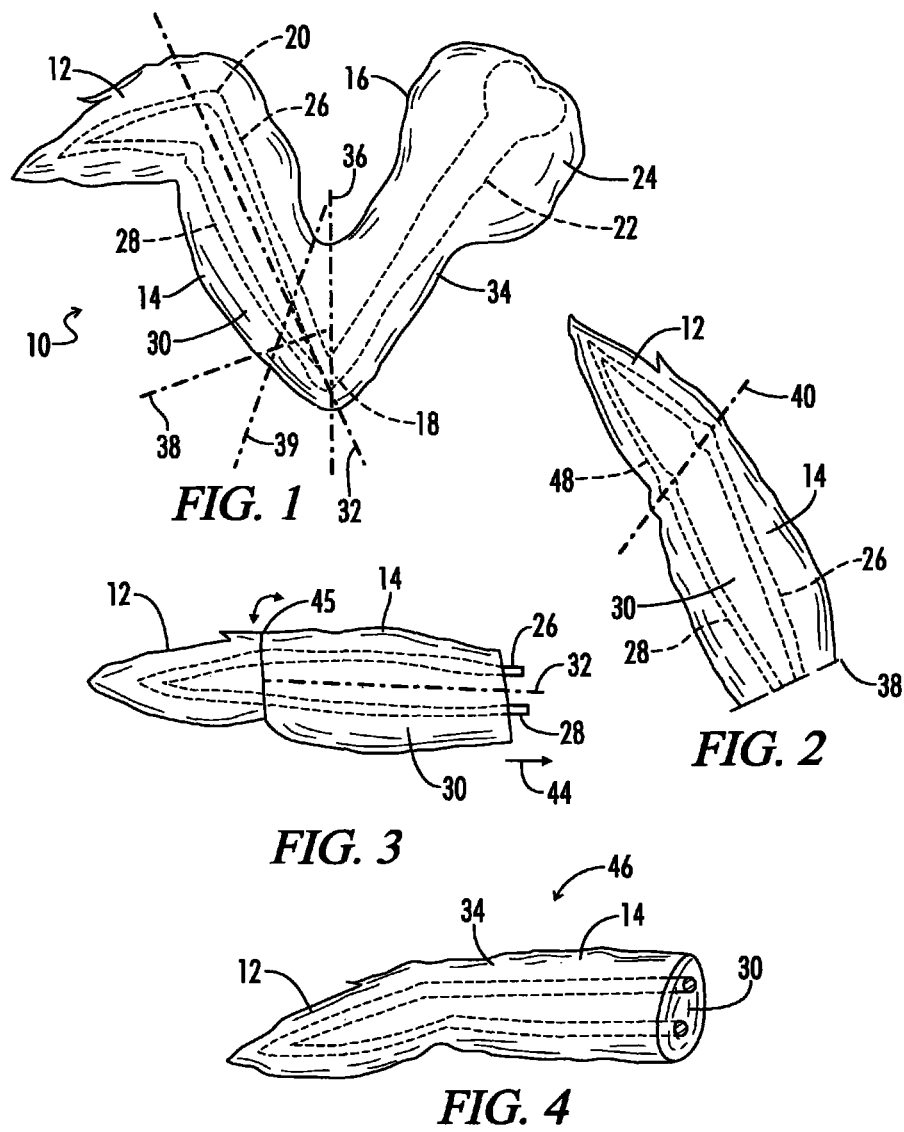

POULTRY WING DEBONING APPARATUS AND METHOD

CROSS-REFERENCE TO RELATED APPLICATIONS

This application claims priority to and is a continuation in part of U.S. patent application Ser. No. 12/378,816, filed Feb. 19, 2009, now abandoned which claimed priority to and was a continuation-in-part of U.S. provisional application Ser. No. 61/066,568, filed Feb. 21, 2008.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The invention pertains to improvements in processing poultry to produce various cuts thereof, and more particularly to processing poultry to produce boneless cuts and especially deboned poultry wings. Known art can be found in class 452, subclasses 135, and in other classes and subclasses.

2. Description of the Known Art

Those skilled in the butchery arts will appreciate that it is often desirable to debone various poultry cuts to enhance the commercial appeal of the respective product. For example, boneless breasts are a popular deboned poultry product. Many poultry products have previously been successfully deboned in commercial quantities by mechanizing production lines to increase output of a particular product, such as the aforementioned boneless breast. However, some poultry products have heretofore resisted prior efforts to mechanize their production. In particular, deboning poultry wings has proved vexatious.

Prior attempts have been made to solve the problems associated with deboning poultry wings, including U.S. Pat. No. 5,368,519 issued to Curtis, et al., on Nov. 29, 1994, that discloses a method of making a food product from a wing of a bird comprising a middle section having a tip section attached to one end and a drumette section attached to the other end. The method comprises cutting the wing to separate the middle section from the drumette section. The middle section is then cut along a line extending generally parallel to the middle section axis and spaced from the joint shared by the middle section and the drumette by a predetermined distance to remove the joint from the middle section. The tip section is then bent with respect to the middle section to expose at least a portion of both of the middle section bones proximate to the joint of the middle section and the tip section. A score line may be used to facilitate exposure of the two bones. The exposed portions of both of the middle section bones are then pulled to remove the two bones from the middle section to thereby provide a food product comprising a boneless middle section attached to the tip section, the tip section functioning as a convenient handle. The method of this patent has proven difficult to mechanize and commercial quantities have been difficult to produce efficiently.

U.S. Pat. No. 5,286,229 issued to Gagliardi, Jr. on Feb. 15, 1994, discloses a method of making a food product from the wing of a bird and food product made in accordance with the method. This patent is directed to a method of making a food product from the wing of a bird comprising a middle section, a tip section and an end section. The method involves cutting through a first joint to separate and remove the tip section. Skin extending between the middle section and the end section is cut along a cutline extending therebetween. The end section is also nicked on a side opposite to the side on which the skin has been cut. A cut is made through the area between the bones of the middle section to separate the middle section into two portions. The end section is bent with respect to the middle section about the joint therebetween so that the middle section and end section are generally aligned end to end with each other with the common joint therebetween. Finally, the two portions of the middle section are spread apart to provide a food product having the appearance of a cowboy wearing chaps. This method has not provided a mechanized solution for deboning poultry wings.

U.S. Pat. No. 5,267,891 issued to Cresson, et al., on Dec. 7, 1993, discloses a machine for processing the meat of chicken wings. This patent is directed to a machine designed for trussing-up flesh and/or skin over a bone or a bone stump. The machine comprises an axially aligned set of a pusher device (11), a holder device (9) and movable jaws forming a cone (44). The machine is adapted for the industrial preparation of ready-to-cook chicken wings. This method has not provided a mechanized solution for deboning poultry wings.

U.S. Pat. No. 5,232,397 issued to Gagliardi, Jr., on Aug. 3, 1993, discloses a method of making a food product from the wing of a bird and food product made in accordance with the method. This patent is directed to a method of making a food product from a wing of a bird is disclosed. The wing includes a middle section, a tip section connected to one end of the middle section, and an end section attached to the other end of the middle section. The food product is produced by cutting the bird wing in order to separate the middle section from the tip and end sections. The separated middle section is cut along a first cut line to remove the first knuckle from the separated middle section. The separated middle section is also cut along a second cut line to remove the second knuckle from the separated middle section. When the food product is cooked, the meat shrinks inwardly to expose end portions of bones within the middle section. The present invention also encompasses the food product which results from the process of the present invention. This method has not provided a mechanized solution for deboning poultry wings.

While it is evident from the past attempts that a deboned poultry wing is desirable, these known art patents are very limited in their teaching and utilization, and an improved apparatus and method for producing deboned poultry wings is needed to overcome these limitations. An improved system should provide a simple mechanism for deboning poultry wings efficiently and in commercial quantities. The method should enable the user to also remove bones from poultry wings using a mechanized process as desired. The mechanized process should permit the user to produce commercial quantities of deboned poultry wings.

SUMMARY OF THE INVENTION

The present invention addresses the perceived needs in the known art discussed above. In one exemplary embodiment in accordance with the present invention an apparatus and method are provided that address the perceived shortcoming of the known art. The apparatus and method in accordance with the present invention enable a user to easily debone commercial quantities of poultry wings in an efficient and economical manner.

The invention includes a method that may be implemented either by a single worker or a plurality of workers that may be conveniently deployed at stations. The stations may include a first, second, third and fourth stations for processing poultry wings to produce deboned poultry wings.

At the first station, the user initially cuts a poultry wing into a first section and a second section for subsequent deboning. At the second station, the second section is placed onto a plate with holes through which the wing bones that are to be removed are extended. At the third station, the bones are removed from the second section through the plate holes and deposited into a separate container for subsequent disposal. At the fourth station, the deboned poultry wing is removed from the plate and deposited into a final product container for subsequent packaging or the like. The work area may be advantageously traversed by a conveyor assembly or the like if desired.

In one exemplary embodiment, an apparatus is employed to substantially mechanize the deboning method. An elongated conveyor assembly traverses the work area to substantially mechanize the deboning method and move the poultry sections between the work stations to enhance the production of the final deboned product.

The apparatus includes an endless webbing looped around an elongated frame with appropriate rotating rollers and tensioners to move the webbing around the frame to provide a moving conveyor. The webbing includes regularly spaced apart holding plates that accept and hold the second section for deboning as the second section moves along the frame between the various stations.

The holding plates move the second section between the first and second stations where the bones are removed. The deboned second section then moves past the third station where it is released at the fourth station.

At the second station, an associated rotary deboner removes the wing bones from the second section for deposit at the third station. The rotary deboner is preferably timed to remove the bones as the holding plates move the second section along the frame.

The holding plates may be pneumatically actuable or spring actuable or otherwise actuable (including hydraulically and electrically) to selectively clamp onto the second section during work upon it and then to release the final deboned wing as the plates approach the fourth station.

It is an object of the present invention to provide an improved apparatus and method that may be used to debone poultry wings.

It is an object of the present invention to provide a substantially mechanized method for removing bones from a poultry wing portion.

Another object of the present invention is to provide a deboned poultry wing.

It is therefore an object of the present invention to provide an apparatus that removes poultry wing bones in an economical and efficient manner.

It is a further object of the present invention to provide an apparatus that may be used to quickly remove bones from poultry wings.

It is a still further object of the present invention to provide a method for removing poultry wing bones.

Another object of the present invention is to provide an apparatus that enables a user to produce commercial quantities of deboned poultry wing portions.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views:

FIG. 1 is a side elevational view of a bird wing which has been severed from a bird;

FIG. 2 is an elevational view of a portion of the bird wing of FIG. 1;

FIG. 3 is a further elevational view of the bird wing portion shown in FIG. 2;

FIG. 4 is a perspective view of a preferred embodiment of a food product made in accordance with the steps illustrated in FIGS. 2-4;

DETAILED DESCRIPTION OF THE INVENTION

Figure 5:
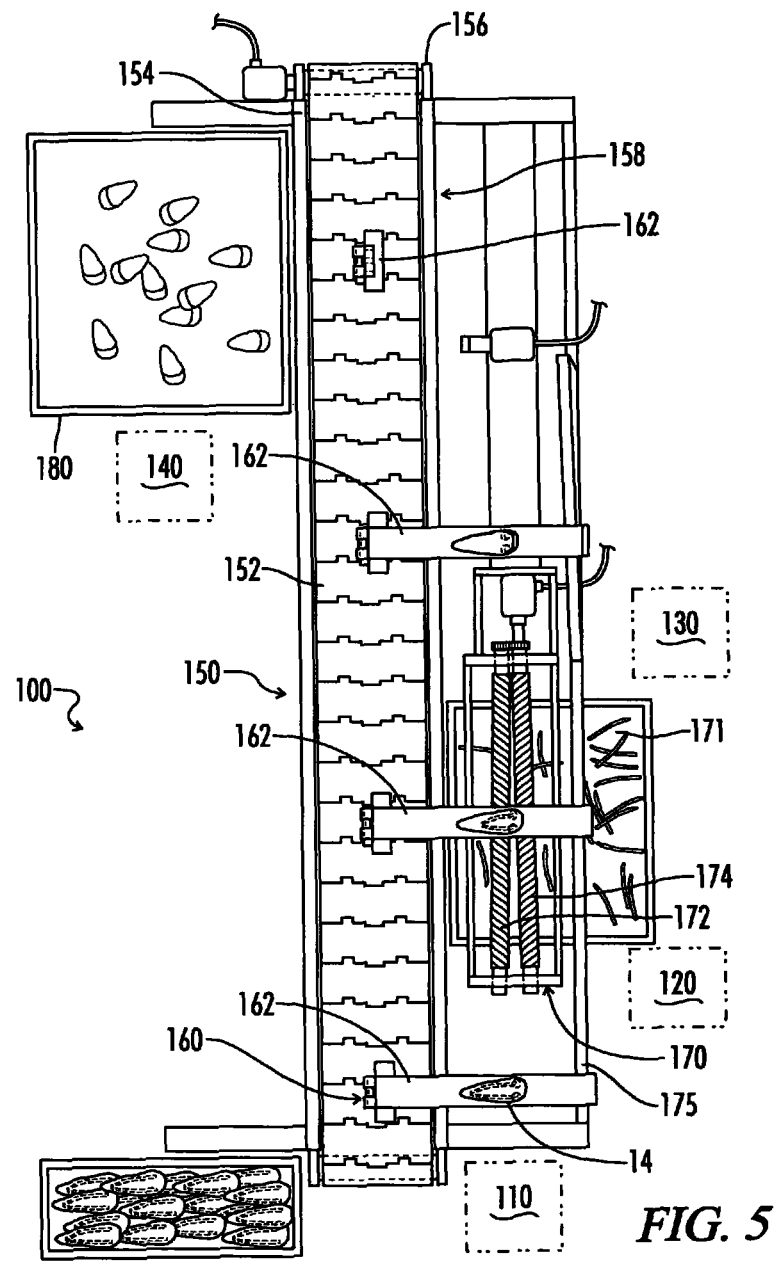
FIG. 5 is a top plan view of an apparatus for mechanizing bone removal in accordance with the present invention; and, FIG. 6 is a greatly enlarged side elevational view of a portion of FIG. 5, showing the wing bones extending through the holding plate.
Figure 6:
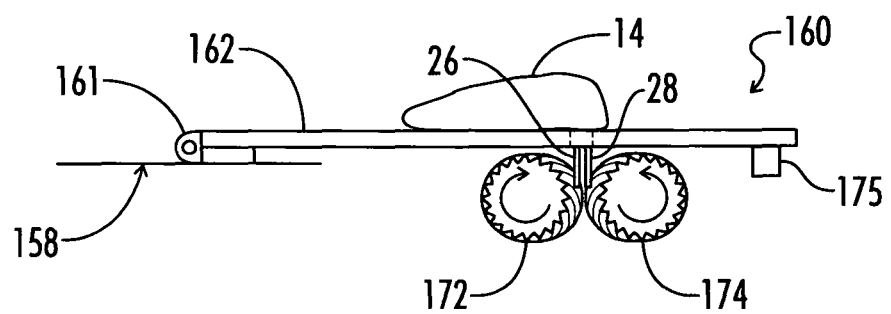

Referring in detail to the drawing, wherein the same numerals indicate like elements throughout, there is shown in FIG. 1 an elevational view of a bird wing 10 which has been severed from a bird (not shown). The bird wing 10 shown in FIG. 1 can be from any type of fowl or poultry carcass and, therefore, the present invention is equally applicable to all types of fowl or poultry, including duck, turkey, squab, chicken, etc., both wild and domesticated. Because the most widely raised type of bird for human consumption is a chicken, the remainder of the description of the preferred embodiment will be specifically directed to a chicken wing, it being clearly understood that the invention is not so limited. The invention may use an apparatus the may be powered pneumatically, electrically, hydraulically or in other conventional ways.

The chicken wing 10 illustrated in FIG. 1 includes a tip section 12, a middle section 14, and an end or drumette section 16. The drumette section 16 is attached or connected to the middle section 14 by a first joint or knuckle 18. Similarly, the tip section 12 is attached or connected to the middle section 14 by a second joint or knuckle 20.

The drumette 16 generally comprises a single elongated bone 22 extending along the entire length of the drumette 16. The drumette 16 further includes meat 24 which surrounds and is generally attached to the bone 22. When severed from the remainder of the wing 10, the drumette 16 has an appearance similar to that of a small-sized drumstick and, as a result, has developed some commercial acceptance.

The tip section 12 is comprised primarily of skin, cartilage and some bone portions and contains little or no consumable meat. As a result, the tip section 12 is generally considered to have little or no commercial value as a meat product.

The middle section 14 includes two generally elongated bones 26, 28 extending generally parallel to each other between the first joint 18 and the second joint 20. The middle section bones 26, 28 are spaced apart from each other and are each surrounded by meat 30 which is attached to both of the bones 26, 28. The middle section 14 further includes an axis 32 which extends generally parallel to the bones 26, 28. As can be seen from FIG. 1, the amount of middle section meat 30 which is available for consumption is limited, and the ratio of middle section meat to bones 26, 28, joints 18, 20, skin, and other inedible components is low. In addition, the placement of the meat 30 relative to the bones 26, 28 and joints 18, 20 makes removal of the meat 30 impractical and makes consumption of the meat 30 from the bones 26, 28 awkward.

In general, the wing 10 is covered by a layer of skin 34 which helps to hold and support the various portions of the wing meat 24, 30 surrounding the various bones 22, 26, 28. It will, of course, be appreciated by those skilled in the art that wings may also be skinless and so the presence or absence of the skin 34 does not affect the scope of the present invention.

In describing the method of the present invention, it is assumed that the wing 10 is received in the condition shown in FIG. 1 in which the tip section 12, middle section 14, and drumette 16 are attached in substantially the same manner as when the wing 10 is removed from the chicken carcass (not shown). It will be appreciated by those skilled in the art that the method of the present invention may be practiced and a food product in accordance with the present invention may be made from a partial wing of a chicken. For example, the drumette section 16 may be removed from the wing 10 prior to performance of the below-described method steps. It should, therefore, be clearly understood that the present invention is not limited to use of the method in connection with a complete wing 10.

The first step of the method for making the food product is separating the middle section 14 from the drumette section 16. Preferably, the drumette section 16 is separated from the middle section 14 by cutting the wing 10 along a first cut line 36 extending generally through the first joint 18. The removed drumette 16 may then be further processed, sold or otherwise disposed of in any desired manner. It should be understood and appreciated by those skilled in the art that other methods may be employed for removing the drumette 16 from the middle section 14 and that the cut line 36 is shown merely to illustrate but a single way to accomplish this result.

The second step involved in the method of making the food product is removing the first joint 18 or at least the remaining portion of the first joint 18 from the middle section 14 in order to remove all the accompanying cartilage, etc. associated with the first joint 18. In the embodiment illustrated, the first joint 18 is removed by cutting the middle section along a second cut line 38 which preferably extends generally perpendicular to the axis 32 and through the two middle section bones 26, 28. The removed first joint 18 may be disposed of in any desired manner. It will, of course, be appreciated by those skilled in the art that the cut line 38 may be angled with respect to the axis 32 and/or the middle section bones 26, 28, and that the actual placement of the cut line 38 along the bones 26, 28 may vary depending upon the size of the joint 18. The purpose in removing the first joint 18 from the middle section 14 is to remove from the middle section all inedible material associated with the first joint 18.

In one alternative method, the only cut line 39 instead intersects the second cut line 38 proximate the first joint 18 but outwardly therefrom (i.e. toward the tip 12). The knuckles of the first joint 18 can be cleaned off the drumette 16 with subsequent processing.

It will also be appreciated by those skilled in the art that, if desired, the steps of separating the drumette section 16 from the middle section 14 and removing the first joint 18 from the middle section 14 may be accomplished simultaneously, for example, by making a single cut along cut line 38 or along another cut line within the middle section 14 and spaced a predetermined minimum distance from the first joint 18. Whether or not the removal of the drumette section 16 and first joint 18 from the middle section 14 is accomplished in one, two or more steps is not meant to be a limitation upon the present invention.

The next step in the method of making the food product involves rotating the wing 10 along a third line 40 extending generally proximate to or through the second joint 20. Preferably, the tip section 12 is first moved to be generally axially aligned with the middle section 14 as shown in FIG. 2. The bones 26, 28 are now separated from the bones 46, 48 by dislocating the bones 26, 28 by applying outward pressure with the thumb and forefinger to dislocate the knuckles proximate bones 26, 28 closest to the third joint 45 (FIG. 3).

The next step in the method of making the food product is to grasp or grip the exposed portions of both of the middle section bones 26, 28 proximate cut line 38 and to expose the two bones 26, 28 in the middle section 14. Preferably, the middle section bones 26, 28 are pulled in a direction generally parallel to the axis 32 as illustrated by direction arrow 44 on FIG. 3. However, it is not necessary that the bones 26, 28 be pulled precisely parallel to the axis 32 in order to effectively remove the bones 26, 28 from the middle section 14. Since the larger portions of the bones 26, 28 and all accompanying cartilage, etc., were previously removed as part of the removal of the first joint 18, the two bones 26, 28 are easily removed from the middle section 14.

Once the bones 26, 28 have been removed from the middle section 14, the tip section 12 may be bent back to its original position with respect to the middle section 14 or to any other suitable position such as a generally aligned or coaxial position as illustrated in FIG. 4. The completed food product, generally 46, as illustrated in FIG. 4, comprises a completely boneless middle section 14 of easily consumable wing meat 30 surrounded by a layer of skin 34. If desired, the skin 34 may be removed to provide a skinless, boneless middle section 14 (not shown). As illustrated in FIG. 4, one end of the boneless middle section 14 remains attached to the tip section 12. The tip section 12 thus serves as a convenient handle for the meat product 46.

The meat product 46 may be prepared for consumption by frying, baking, broiling or in virtually any other manner known or apparent to those skilled in the art. Once the food product 46 has been prepared for consumption, a consumer may grasp the tip section 12 as a convenient way of holding the food product 46 to facilitate consumption of the boneless middle section 14. If desired, prior to or during consumption, the boneless middle section 14 may be dipped or spread with a suitable sauce, gravy, topping or the like (not shown). In this manner, the consumer is able to hold the food product 46 by the tip section 12 without having the tip section 12 become immersed in the gravy, sauce or the like. Thus, the food product 46 is particularly well adapted for serving as an hors d'oeuvre at cocktail parties or the like since consumption of the food product 46 with or without gravy, sauce or the like is convenient, even with one hand. Once the boneless middle section 14 has been consumed, the tip section 12 may be conveniently discarded.

The preceding method may also be conveniently used in a work area 100 by workers deployed at a first, second, third and fourth stations (110, 120, 130 and 140) for processing the poultry wing 10 to produce a deboned poultry meat product 46 as shown in FIG. 5. At the first station 110, the user initially cuts the poultry wing as described hereinabove into a first drumette section 16 and a middles section 14 with an adjoining tip section 16. At the second station 120, the tip and middle section are placed onto a plate with holes through which the wing bones 26, 28 that are to be removed are extended. At the third station 130, the bones 26, 28 are removed from the middle section 14 through the plate holes and deposited into a separate container for subsequent disposal. At the fourth station 140, the deboned poultry wing 46 is removed from the plate and deposited into a final product container for subsequent packaging or the like. The work area 100 may be advantageously traversed by a conveyor assembly 150 or the like if desired.

In one exemplary embodiment, an apparatus is employed to substantially mechanize the deboning method. An elongated conveyor assembly 150 traverses the work area 100 to substantially mechanize the deboning method and move the poultry between the work stations 110, 120, 130 and 140 to enhance the production of the final deboned product 46.

The apparatus 150 includes an endless webbing 152 looped around an elongated frame 154 with appropriate rotating rollers and tensioners 156 to move the webbing 152 around the frame 154 to provide a moving conveyor generally designated with reference numeral 158. The webbing 152 includes regularly spaced apart holders 160 that accept and retain the middle section 14 for deboning as it moves along the frame 154 between the various stations 110, 120, 130 and 140.

The holders 160 move the middle section 14 between the first and second section where the bones 26, 28 are removed. The deboned middle section then moves past the third station 130 where it is released at the fourth station 140. The holders 160 include an inner pivotal coupling 161 that secures a large flat top plate 162 to the webbing 152. The flat top plate 162 may thus support the middle section 14 above the webbing 152. Each coupling 161 permits the plate 162 to move from a substantially horizontal orientation to a substantially vertical orientation as the holders 160 complete an entire circuit about frame 154. The distal end 164 of plate 162 is penetrated by two spaced apart holes 166, 168 through which the ends of bones 26, 28 from middle section 14 proximate cut line 38 may be inserted while the remainder of the poultry piece rests upon the plate 162. The bones 26, 28 should extend through plate 162 approximately one inch, although they may extend further without disrupting matters. The primary consideration is that the bones 26, 28 extend sufficiently far beneath plate 162 such that the rotary bone extractor 170 may grab and remove bones 26, 28 as the plate moves through the second station 120 (FIG. 5A).

At the second station 120, an associated rotary bone extractor 170 grabs and removes the wing bones 26, 28 from the middle section 14. The rotary bone extractor 170 includes oppositely rotating and converging wheels 172, 174 that rotate inwardly to pull bones 26, 28 downwardly from plate 162 toward the floor 101. Bone extractor wheels 172, 174 may be pneumatically powered (or otherwise conventionally powered including hydraulically, electrically and the like) and timed to move in conjunction with webbing 152. In this manner, various sizes of bones 26, 28 are captivated by the convergent nature of wheels 172, 174 as the plate 162 moves along station 120 and along frame 152. Of course, other alternatives are possible to move the hones in relation to the plate holes to enable their removal thereby. For example, the plate may be stationary as in the preceding example. The plate could also move with respect to a stationary middle section as well. The bones could also be held stationary while the plate was moved in relation thereto. The primary concern is that the bones move relative to the plate while the middle section remains on the opposite side of the plate from the bones.

In the exemplary embodiment, the plate rides against a rail during movement along the conveyor belt. As the plate moves past the second station 120, the plate rides up on the rail 175 to clear machinery associated with the bone extractor 170. This upward movement also facilitates bone movements as the bone extractor 170 dumps the removed bones 26, 28 into a collection bucket 171 or the like. The rail 175 can also guide the plate 162 into a substantially vertical orientation at the fourth station 140 to dump the boneless middle and tip sections into a collection bucket 180 or the like.

The holding plate may also include an optional clamp or the like to secure the middle section to the plate. This prevents the middle section from falling off of the plate during movement. The holding plates can also be pneumatically actuable or spring actuable or otherwise actuable to selectively clamp onto the second section during work upon it and then to release the final deboned wing as the plates approach the fourth station.

In describing a preferred embodiment of the invention illustrated in the drawings, specific terminology has been used for the sake of clarity. However, the invention is not intended to be limited to the specific terms selected, and it is to be understood that each specific term includes all technical equivalents which operate in a similar manner to accomplish a similar purpose.

What is claimed is:

1. An apparatus for deboning a severed bird wing comprising:
    a conveyor including a webbing adapted to selectively move about a frame;
    at least one plate coupled to the webbing and having a surface supporting the wing on top of the surface;
    at least one hole extending completely through the plate and adapted to have a bone in the wing inserted through the hole;
    an extractor adapted to engage the bone to move the bone relative to the hole to remove the bone from the wing;
    a motor adapted to selectively move the webbing along the frame and a second motor for selectively actuating the extractor as the plate moves above the extractor to remove the bone from the wing.

2. The apparatus as recited in claim 1 wherein said at least one plate includes a plurality of plates.

3. The apparatus as recited in claim 1 wherein said at least one hole in the plate includes a plurality of holes in the plate, each of the holes extending completely through the plate.

4. The apparatus as recited in claim 1 further including a rail outside of the periphery of the webbing and upon which a terminal end of the plate rests as the plate moves about the frame.

5. The apparatus as recited in claim 4 wherein the rail moves the plate from an orientation where the surface is substantially horizontal and the wing rests upon the surface to an orientation where the surface is substantially vertical and the wing does not rest upon the surface.

6. The apparatus as recited in claim 1 wherein the extractor comprises two convergent rotary wheels.

7. The apparatus as recited in claim 1 wherein the extractor and the conveyor are pneumatically powered.

8. The apparatus as recited in claim 1 wherein the extractor and the conveyor are electrically powered, each of the holes extending completely through the plate.

9. The apparatus as recited in claim 1 wherein the extractor and the conveyor are hydraulically powered.

10. An apparatus for deboning a severed bird wing comprising:
- a conveyor including a webbing adapted to selectively move about a frame;
- at least one plate coupled to the webbing and having a surface supporting the wing on top of the surface;
- at least one hole extending completely through the plate and adapted to have a bone in the wing inserted through the hole;
- an extractor adapted to engage the bone to move the bone relative to the hole to remove the bone from the wing;
- a motor adapted to selectively move the webbing along the frame and a second motor for selectively actuating the extractor as the plate moves above the extractor to remove the bone from the wing; and,
- a rail outside of the periphery of the webbing and upon which a terminal end of the plate rests as the plate moves about the frame.

11. The apparatus as recited in claim 10 wherein said at least one plate includes a plurality of plates.

12. The apparatus as recited in claim 10 wherein said at least one hole in the plate includes a plurality of holes in the plate, and hole extends completely through the plate.

13. The apparatus as recited in claim 12 wherein the rail moves the plate from an orientation where the surface is substantially horizontal and the wing rests upon the surface to an orientation where the surface is substantially vertical and the wing does not rest upon the surface.

14. The apparatus as recited in claim 10 wherein the extractor comprises two convergent rotary wheels.

15. The apparatus as recited in claim 10 wherein the extractor and the conveyor are pneumatically powered.

16. The apparatus as recited in claim 10 wherein the extractor and the conveyor are electrically powered.

17. The apparatus as recited in claim 10 wherein the extractor and the conveyor are hydraulically powered.

18. An apparatus for deboning a severed bird wing comprising:
- a conveyor including a webbing adapted to selectively move about a frame;
- at least one plate coupled to the webbing and having a surface supporting the wing on top of the surface;
- at least one hole extending completely through the plate and adapted to have a bone in the wing inserted through the hole;
- an extractor adapted to engage the bone to move the bone relative to the hole to remove the bone from the wing;
- a motor adapted to selectively move the webbing along the frame a second motor for selectively actuating the extractor as the plate moves above the extractor to remove the bone from the wing;
- a rail outside of the periphery of the webbing and upon which a terminal end of the plate rests as the plate moves about the frame; and,
- the rail moves the plate from an orientation where the surface is substantially horizontal and the wing rests upon the surface to an orientation where the surface is substantially vertical and the wing does not rest upon the surface.

19. The apparatus as recited in claim 18 wherein said at least one plate includes a plurality of plates and at least one hole in the plate includes a plurality of holes in the plate, each of the holes extending completely through the plate.

20. The apparatus as recited in claim 18 wherein the extractor comprises two convergent rotary wheels.

\* \* \* \* \*